United States Patent [19]

Clark

[11] Patent Number: 4,533,152
[45] Date of Patent: Aug. 6, 1985

[54] AUTOMATIC VARIABLE SPEED LEVER ACTION DRIVE

[75] Inventor: Marion A. Clark, Tulare, Calif.

[73] Assignee: Don Good, Tulare, Calif.; a part interest

[21] Appl. No.: 593,518

[22] Filed: Mar. 26, 1984

[51] Int. Cl.³ .............................................. B62M 1/08
[52] U.S. Cl. ................ 280/251; 280/255
[58] Field of Search ........... 260/251, 253, 255, 244, 260/246, 238, 243, 236; 474/100, 109, 136, 137; 74/137, 141, 594.3

[56] References Cited

U.S. PATENT DOCUMENTS

| | | | |
|---|---|---|---|
| 636,184 | 10/1899 | Roxendorff | 280/251 |
| 2,638,359 | 5/1953 | Crumble | 280/253 |
| 3,913,945 | 10/1975 | Clark | 280/233 |
| 4,271,712 | 6/1981 | White | 280/251 |

FOREIGN PATENT DOCUMENTS 493909 6/1978 Australia ........................... 280/253

Primary Examiner—Joseph F. Peters, Jr.
Assistant Examiner—Mark C. Dukes
Attorney, Agent, or Firm—Brown, Martin & Haller

[57] ABSTRACT

An automatic variable speed lever action drive for a pedal operated vehicle, in which a pedal lever pivotally mounted on each side of the vehicle frame is connected in part by an extensible and retractable cable to a driven wheel, the lever having a direct driving connection to the cable through a roller on a tension spring for deflecting the cable to varying degrees in accordance with the tension load on the cable. The lever has a knee joint type double pivot and is guided through the actuating stroke to substantially linearize the actual path of the pedal.

7 Claims, 6 Drawing Figures

4,533,152

AUTOMATIC VARIABLE SPEED LEVER ACTION DRIVE

BACKGROUND OF THE INVENTION

Bicycles with lever action drive usually have a fixed drive ratio. Some have been made with adjustment means for changing the ratio, such as by moving the drive chain or cable attachment to the pedal lever, which requires stopping the pedal action to make the adjustment. My U.S. Pat. No. 3,913,945 incorporates such a mechanism but requires only a slight hesitation in the pedal action to change the ratio.

Using a conventional multi-ratio gear assembly on the drive wheel axle would not be practical, since the pedal levers are usually independently operated and two such bulky hubs would be required.

SUMMARY OF THE INVENTION

The lever action drive mechanism described herein provides an automatic change in drive ratio depending on the existing load. Pedal levers pivotally mounted on the frame are connected by cables to chains which engage drive sprockets on the driven wheel axle of the bicycle or tricycle. Conventional freewheeling clutches allow for spring return of the chains and pedal levers. The cables pass over pulleys and are connected to the pedal levers, so that each stroke produces a specific length of pull on the cables. Riding on each cable between the pulley and the pedal lever is a roller, which is coupled by a spring to the pedal lever between the cable attachment and the pedal. Under light load the roller pulls the cable down and increases the drive ratio. Under heavy load the roller cannot pull down so easily against the cable tension, so the spring stretches to accommodate the difference in cable deflection. Thus, the drive ratio is continuously adjusted to the existing load, without requiring any action by the rider.

Each pedal lever is also double pivoted on a link which provides an effective knee action to make the leg thrust more effective. The pedal lever motion is controlled by a guide so that the initial motion is almost straight down, then the link swings forward and upward against a stop while the pedal moves downward and forward to utilize the maximum thrust of the rider's leg.

The mechanism can also be used with a single chain or belt drive to the driven wheel to minimize the hub size, the chain belt being coupled to cable driven pulleys which incorporate the necessary freewheeling clutches.

The primary object of this invention, therefore, is to provide a new and improved automatic variable speed lever action drive for a bicycle or tricycle.

Another object of this invention is to provide a lever action drive in which the drive ratio automatically adjusts itself to the existing load.

A further object of this invention is to provide a lever action drive in which the pedal levers are double pivoted and guided to ensure the most effective application of the rider's leg action.

Other objects and advantages will be apparent in the following detailed description in conjunction with the accompanying drawings, in which.

DESCRIPTION OF THE PREFERRED EMBODIMENTS

Figure 1:
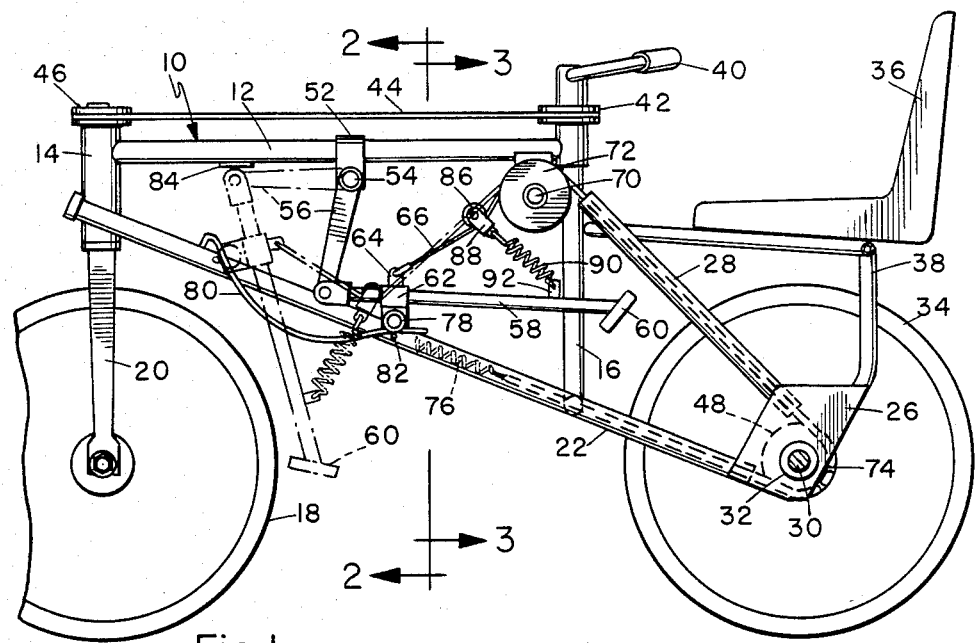
FIG. 1 is a side elevation view of a tricycle incorporating the lever action drive mechanism, the nearside rear wheel being omitted for clarity.
Figure 2:
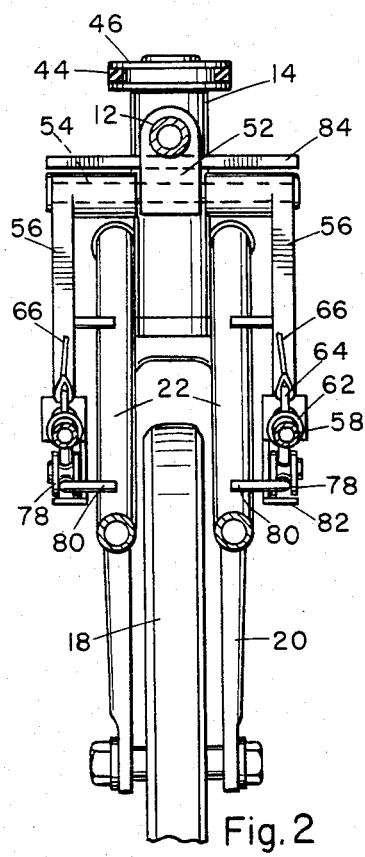
FIG. 2 is an enlarged sectional view taken on line 2—2 of FIG. 1.

The mechanism is illustrated in FIGS. 1-4 as adapted to a tricycle, but can also be applied to a bicycle or other pedal driven vehicle.

The frame 10 includes a top bar 12 to which is fixed a post 16, the front wheel 18 being mounted in a fork 20 which is rotatable in fork tube 14. A pair of tubular side rails 22 extend rearwardly and angularly downwardly from fork tube 14, the side rails straddling and being fixed to the lower end of rear post 16 by a crosspiece 24. Fixed to the rear ends of side rails 22 are bearing plates 26, which are further supported by bracing tubes 28 extending diagonally to the upper portion of rear post 16 to form a rigid frame. A rear axle 30 is supported in bearings 32 on the bearing plates 26, and wheels 34 are attached to the ends of the axle in any suitable manner.

Figure 3:
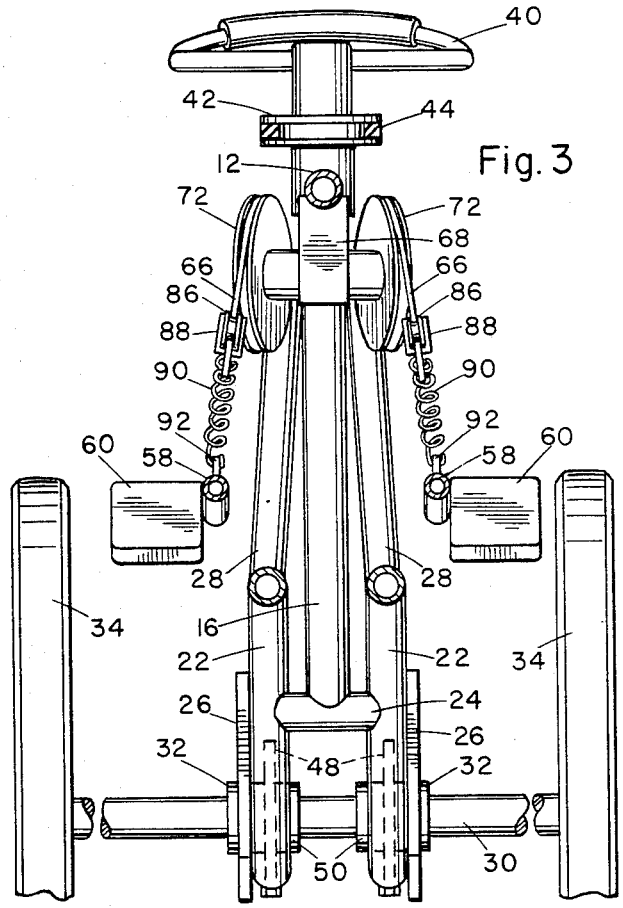
FIG. 3 is an enlarged sectional view taken on line 3—3 of FIG. 1.
Figure 4:
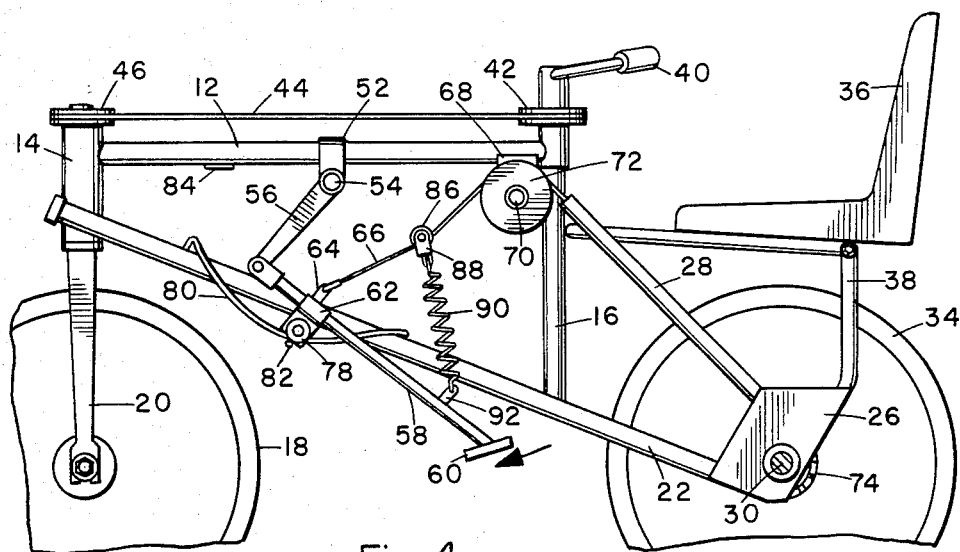
FIG. 4 is a view similar to FIG. 1, showing the action under a heavy load.

In the configuration shown, a seat 36 is mounted rearwardly of rear post 16 on a support frame 38 for a rider who is not comfortable on a small bicycle saddle. In FIG. 3, the seat and its support are omitted for clarity. A steering handle 40 is rotatably mounted on top of the rear post 16 and has a pulley 42 with a connecting belt 44 extending to a pulley 46 attached to the front fork 20.

On the rear axle 30 inside bearing plates 26 and in alignment with the side rails 22 and bracing tubes 28 are dual sprockets 48, with oppositely handed one way or freewheeling clutches 50. Either or both sprockets can thus be driven to rotate the rear axle.

The lever action drive mechanism is completely duplicated on opposite sides of the frame and one side will be described. Fixed on the central portion of top bar 12 is a bracket 52 with a horizontal cross pin 54, on which is journalled a link 56. A lever 58 is pivotally attached at one end to the free end of link 56 and at the other end of the lever is a pedal 60, which may be fixed at a suitable angle as shown, or may be of the conventional rotary type. The link and pedal lever swing in a generally vertical plane spaced from the side of the frame.

Fixed on the lever 58 near its pivoted end is a retaining bracket 62 having a lug 64, to which is secured one end of a cable 66. On the underside of top bar 12, adjacent the rear post 16, is a bearing bracket 68 having an outwardly projecting stub shaft 70 carrying a guide pulley 72. Cable 66 extends over guide pulley 72 and into the bracing tube 28, where it is connected to a drive chain 74. The drive chain 74 passes around sprocket 48 and into the tubular side rail 22, where it is connected to a return spring 76.

On the lower portion of retaining bracket 62 is a grooved roller 78 which rides on a guide track 80 fixed to side rail 22, the bracket having a lower retainer 82 under the track to hold the roller in place. From the rear the guide track 80 curves downwardly then curves upward and forward. The specific shape will depend on the proportions of the link and lever and is arranged so that the initial motion of the lever is primarily on its pivot to the link. Then the link swings up and is held by a stop 84 on the top bar 12 as the stroke is completed, as indicated in the broken line position in FIG. 1. This knee type action reduces the downward arc of the pedal and provides a near linear thrust path for maximum effectiveness.

The automatic variable speed action is provided by a tension pulley 86 which rides on cable 66 between the pulley 72 and lever 58 and is held in a small yoke 88. The yoke 88 is coupled by a tension spring 90 to a lug 92 on the lever 58 adjacent pedal 60. When the pedal lever is pushed down, the tension pulley 86 exerts a downward pull on cable 66, which increases the length of cable pulled out by the stroke. Under a light load, as when riding on a level surface, the cable deflection will be maximum and the mechanism will have a high effective gear ratio. Under a heavy load, as when climbing hills, the tension on cable 66 will be high and deflection will be minimal, as in FIG. 4. The spring 90 will stretch to accommodate the lever motion and the mechanism will have a low effective gear ratio. The drive ratio will thus vary automatically in accordance with the existing load and no shifting or other adjustments will be necessary.

Figure 5:
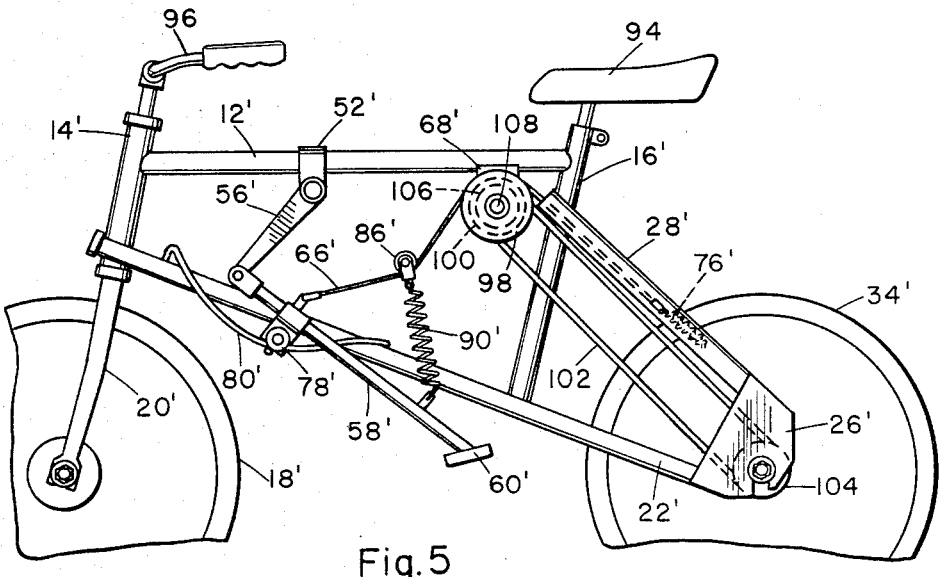
FIG. 5 is a side elevation view of a bicycle incorporating the lever action mechanism with a belt drive to the rear wheel.
Figure 6:
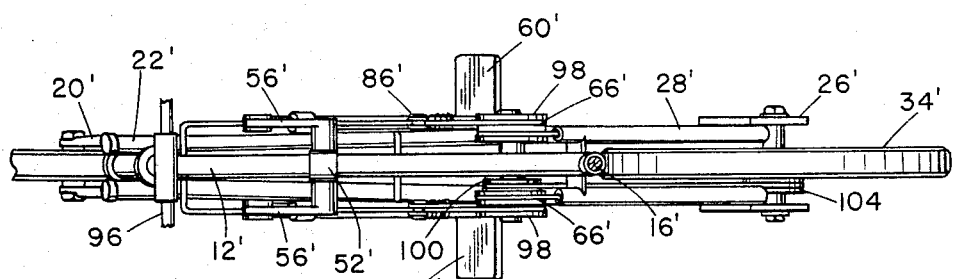
FIG. 6 is a top plan view of the structure of FIG. 5, with the saddle omitted for clarity.

The mechanism is also adaptable to a bicycle, as illustrated in FIGS. 5 and 6. Most of the structure is identical or similar to that described and all comparable elements are similarly numbered, with the addition of a prime.

The frame is basically the same except that a saddle 94 is mounted on the rear post 16′, handlebars 96 are attached to front fork 20′ and a single rear wheel 34′ is used. Instead of the simple pulleys 72, wide coupling pulleys 98 are mounted on the bearing bracket 68′ and cables 66′ are wrapped several times around the pulleys and secured in any suitable manner. Coaxial with one pulley 98 is a drive pulley 100, from which a drive belt 102 extends to a rear pulley 104 attached to the rear wheel 34′. By using a single drive belt, the bulk of the rear wheel hub is minimized.

Pulleys 98 contain oppositely handed one-way clutches 106 which are coupled to a common shaft 108 with drive pulley 100, so that rotation of either or both pulleys will drive the rear wheel. Each cable 66′ is connected directly to a return spring 76′ contained in the bracing tube 28′. The operation is as described above, with the automatic variable speed function.

In either configuration the pedal levers can be used independently, alternately, or together to drive the vehicle.

Having described my invention, I claim:

1. In a wheeled vehicle having a frame with a forward end portion and a rear portion with at least one driven wheel therein, an automatic variable speed lever action drive, comprising:

a pair of pedal levers having forward ends pivotally attached to said frame to swing substantially vertically on opposite sides of the frame, said levers extending rearwardly and having foot pedals on the rear ends thereof;

drive means connecting each of said levers to said driven wheel, each drive means including an extensible and retractable cable;

said cable being secured at one end to said lever adjacent the forward end;

a tension pulley mounted to roll on the cable; and a tension spring connecting the tension pulley to the rear portion of the lever for applying a deflection to the cable in proportion to the existing tension on the cable.

2. The structure of claim 1, wherein each of said levers includes a link having one end pivotally attached to the frame and another end pivotally connected to the lever; and guide means on the frame in engagement with said levers to guide the levers and provide a substantially linear path of motion of the pedals.

3. The structure of claim 2, wherein said guide means comprises downwardly concave guide tracks, and rollers mounted on said levers adjacent the pivotal connections to said links, said rollers riding on the tracks; and stops on said frame for limiting the motion of said links.

4. The structure of claim 2, wherein said driven wheel has a pair of sprockets with individual one-way clutches coupled to drive the wheel in a forward direction;

a drive chain attached to each of said cables and passing around one of said sprockets to drive said wheel when the cable is extended; and a return spring connected between each chain and the frame to retract the respective cable.

5. The structure of claim 4, wherein said frame includes tubular members in which portions of said cables and chains are enclosed;

and guide pulleys rotatably mounted on said frame for guiding the cables into the tubular members;

said tension pulleys engaging the cables between said levers and said guide pulleys.

6. The structure of claim 2, wherein said drive means includes a pair of coupling pulleys mounted on said frame, the coupling pulleys having oppositely handed one-way clutches with a common connecting shaft, said cables passing around and being attached to the coupling pulleys; and a driving connection between said common shaft and the driven wheel.

7. The structure of claim 6, wherein said driving connection comprises a drive pulley on said common shaft, a driven pulley on the driven wheel, and a drive belt connecting the drive and driven pulleys.

* * * * *